(12) United States Patent
Qiu et al.

(10) Patent No.: US 10,572,001 B2
(45) Date of Patent: Feb. 25, 2020

(54) CONTROLLING A DEVICE BY TRACKING THE MOVEMENT OF A FINGER

(71) Applicant: Board of Regents, The University of Texas System, Austin, TX (US)

(72) Inventors: Lili Qiu, Austin, TX (US); Sangki Yun, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 71 days.

(21) Appl. No.: 15/834,417

(22) Filed: Dec. 7, 2017

(65) Prior Publication Data

US 2018/0164874 A1 Jun. 14, 2018

Related U.S. Application Data

(60) Provisional application No. 62/432,453, filed on Dec. 9, 2016.

(51) Int. Cl.
*G06F 3/01* (2006.01)
*G01S 15/66* (2006.01)
*H04M 1/725* (2006.01)

(52) U.S. Cl.
CPC ............ *G06F 3/011* (2013.01); *G01S 15/66* (2013.01); *H04M 1/72519* (2013.01)

(58) Field of Classification Search
CPC ........ G01S 7/527; G01S 7/5273; G01S 15/50; G06F 3/043; G06F 3/0433; G06F 3/0436
See application file for complete search history.

(56) References Cited

U.S. PATENT DOCUMENTS

| | | |
|---|---|---|
| 2007/0160165 A1 | 7/2007 | Morgan |
| 2007/0288194 A1* | 12/2007 | Boillot ................. G06F 3/0304 702/150 |
| 2010/0234044 A1 | 9/2010 | Lohbihler |
| 2010/0240999 A1 | 9/2010 | Droitcour et al. |

(Continued)

OTHER PUBLICATIONS

International Search Report and Written Opinion of the International Searching Authority for International Application No. PCT/US2017/065031 dated Feb. 28, 2018, pp. 1-9.

(Continued)

*Primary Examiner* — Kevin M Nguyen
(74) *Attorney, Agent, or Firm* — Robert A. Voigt, Jr.; Winstead PC (57) ABSTRACT

A method, system and computer program product for controlling a device (e.g., smartphone) by tracking a movement of a target (e.g., finger). A channel impulse response which characterizes signal traversal paths with different delays is estimated. Channel tap(s) corresponding to the target are then selected. The phase change of the selected channel taps is tracked based on the estimated channel impulse response to estimate a distance change of the target from the device. An estimate of an absolute distance between the device and the target is estimated based on the estimated channel impulse response. A more accurate absolute distance between the device and the target is calculated by combining the estimated absolute distance and the estimated distance change. The position of the target is then tracked based on a distance to different landmarks (e.g., microphones) on the device using the more accurate absolute distance and the estimated distance change.

63 Claims, 7 Drawing Sheets

(56) References Cited

U.S. PATENT DOCUMENTS

| | | | | |
|---|---|---|---|---|
| 2012/0001875 A1* | 1/2012 | Li | ............... | G01S 7/5273 |
| | | | | 345/177 |
| 2012/0243374 A1* | 9/2012 | Dahl | ............... | G06F 3/043 |
| | | | | 367/93 |
| 2016/0321917 A1 | 11/2016 | Qiu et al. | | |
| 2017/0164321 A1 | 6/2017 | Qiu et al. | | |
| 2017/0212235 A1 | 7/2017 | Qiu et al. | | |

OTHER PUBLICATIONS

Wang et al., "Device-Free Gesture Tracking Using Acoustic Signals," Proceedings of the 22nd Annual International Conference on Mobile Computing and Networking, New York City, New York, Oct. 3-7, 2016, pp. 82-94.

Yun et al., "Strata: Fine-Grained Acoustic-Based Device-Free Tracking," MobiSys'17, Niagara Falls, New York, Jun. 19-23, 2017, pp. 15-28.

Yun et al., "Turning a Mobile Device into a Mouse in the Air," MobiSys'15, Florence, Italy, May 18-22, 2015, pp. 1-15.

Mao et al., "CAT: High-Precision Acoustic Motion Tracking," MobiCom'16, New York City, New York, Oct. 3-7, 2016, pp. 1-13.

\* cited by examiner

CONTROLLING A DEVICE BY TRACKING THE MOVEMENT OF A FINGER

TECHNICAL FIELD

The present invention relates generally to controlling devices, and more particularly to controlling a device (e.g., smartphone) by tracking the movement of a finger.

BACKGROUND

Smart TVs, smart appliances, Virtual Reality (VR), and Augmented Reality (AR) are all becoming increasingly popular. The key to their success is having an easy-to-use user interface to control the device (e.g., smart TVs, smart appliances and devices implementing VR/AR). Currently though such devices lack an easy-to-use user interface.

Smart TVs are currently cumbersome to control by having the user navigate through various menus. Many smart appliances require users to manually launch smartphone applications and click through pages to control the smart appliance, which is even more cumbersome than turning on/off switches. VR and AR provide an immersive experience, and open the doors to new ways of training, education, meeting, advertising, travel, health care, emergency responses, and scientific experiments. However, the current user interface of devices implementing VR/AR are rather limited: they rely on tapping, swiping, voice recognition, or steering the camera towards the hand to make sure the hand is within the view and line-of-sight of the camera while wearing the headset.

Recently, there has been research conducted concerning motion tracking as a means for controlling the device. However, despite some progress, achieving highly accurate and responsive device-free tracking on commodity hardware remains an open challenge. According to game and application developers, sub-centimeter level accuracy and a response time within 16 ms are required in order to provide a good user experience. This is especially challenging to achieve using a commodity device, such as a smartphone, given its limited processing power and lack of special hardware.

Hence, there is not currently a means for easily interacting and controlling devices, such as smart devices and devices implementing VR/AR, via highly accurate and responsive device-free tracking.

SUMMARY

In one embodiment of the present invention, a method for controlling a device by tracking a movement of a target comprises estimating a channel impulse response which characterizes signal traversal paths with different delays at one or more frequencies. The method further comprises selecting one or more channel taps corresponding to the target. The method additionally comprises estimating a phase change of the selected one or more channel taps based on the estimated channel impulse response to estimate a distance change of the target from the device. Furthermore, the method comprises tracking, by a processor, the movement of the target using the estimated distance change of the target from the device.

Other forms of the embodiment of the method described above are in a device and in a computer program product.

In one embodiment of the present invention, a method for controlling a device by tracking a movement of a target comprises calculating an estimate of an absolute distance between the device and the target based on an estimated channel impulse response at one or more frequencies. The method further comprises tracking, by a processor, the movement of the target using the estimated absolute distance between the device and the target.

Other forms of the embodiment of the method described above are in a device and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

While the following discusses the present invention in connection with controlling a device (e.g., computers, game consoles, VR/AR headsets and smart devices, such as smartphones and smart watches) using the movement of a finger, the principles of the present invention may be applied to controlling the device using the movement of any target (e.g., pen, pencil). A person of ordinary skill in the art would be capable of applying the principles of the present invention to such implementations. Further, embodiments applying the principles of the present invention to such implementations would fall within the scope of the present invention.

As discussed below, the present invention provides a device-free tracking system using acoustic signals. In one embodiment, a mobile computing device (e.g., smartphone) continuously transmits inaudible acoustic signals. The signals are reflected by nearby objects, including a moving finger, and arrive at the microphone on the mobile computing device. The mobile computing device analyzes the received signal to estimate the channel, based on which it estimates the distance change of the finger and the absolute distance between the mobile computing device and the finger in order to locate the finger.

Due to the small wavelength of acoustic signals, it is promising to derive the distance change of the finger based on the phase. However, like many wireless signals, audio signals travel through multiple paths to reach the receiver, such as due to the reflection by different objects. Such multipath propagation poses significant challenges to using the phase of the raw received signal for tracking. To address the challenge, the present invention estimates the channel impulse response (CIR) in the time-domain. The estimate gives the channel coefficient of each channel tap. An appropriate channel tap is then selected where the phase of the selected tap is used to estimate the distance change of the finger.

To further derive the absolute distance, a framework was developed to estimate the absolute distance of the path reflected by the moving finger during a few consecutive intervals, such that its changes match with the changes in the CIR during these intervals. Inferring the absolute distance serves two purposes: (i) an initial absolute distance is obtained so that the subsequent distance change of the finger can be translated into a new absolute distance between the mobile computing device and the finger; and (ii) it can be used to improve the tracking accuracy and alleviate error accumulation in subsequent intervals by combining it with the relative distance change.

In one embodiment, the approach of the present invention was implemented on a smartphone with one speaker and two microphones which enabled real-time tracking of the user's moving finger with high accuracy (within 0.3 mm distance tracking error, 0.99 mm two-dimensional tracking error and 0.5 mm drawing error in a two-dimensional space), low latency (update position every 12.5 ms) and easy to deploy (present invention simply utilized a smartphone that can track the movement of a nearby finger without any extra hardware).

In the following description, numerous specific details are set forth to provide a thorough understanding of the present invention. However, it will be apparent to those skilled in the art that the present invention may be practiced without such specific details. For the most part, details considering timing considerations and the like have been omitted inasmuch as such details are not necessary to obtain a complete understanding of the present invention and are within the skills of persons of ordinary skill in the relevant art.

Figure 1:
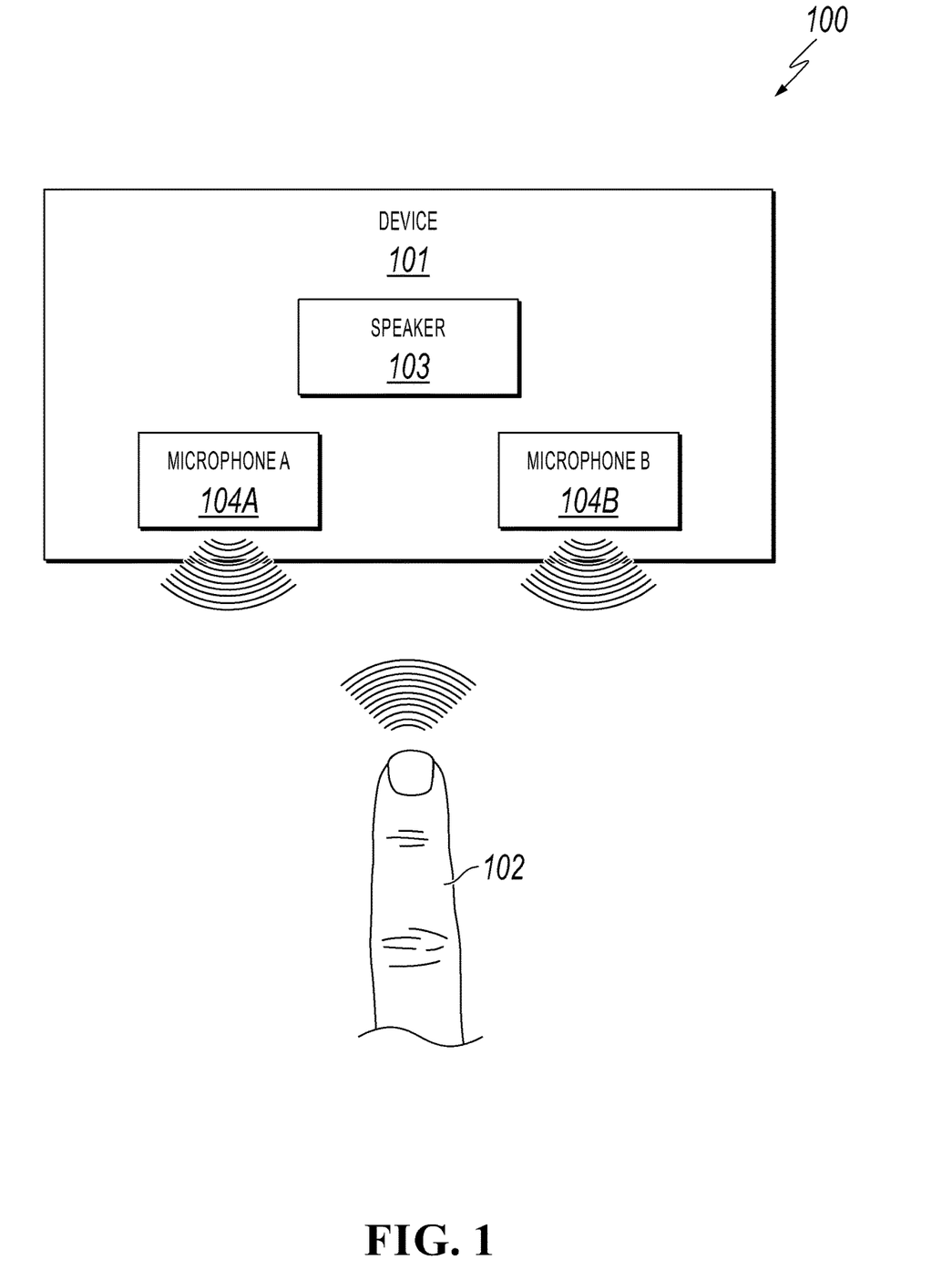
FIG. 1 illustrates a system configured in accordance with an embodiment of the present invention.

Referring now to the Figures in detail, FIG. 1 illustrates a system 100 configured in accordance with an embodiment of the present invention. Referring to FIG. 1, system 100 includes a device 101 to be controlled by a finger 102 of a user. Device 101 may be any computing device that contains a speaker 103 and two microphones 104A-104B (identified as "Microphone A" and "Microphone B," respectively, in FIG. 1). Microphones 104A-104B may collectively or individually be referred to as microphones 104 or microphone 104, respectively. While FIG. 1 illustrates device 101 as including one speaker 103 and two microphones 104, device 101 of the present invention is not to be limited in scope to only including a single speaker 103 and two microphones 104. Instead, device 101 may include one or more speakers 103 and one or more microphones 104. Some examples of device 101 include but not limited to computers, video game consoles, VR/AR headsets, smart TVs and smart appliances. Device 101 is configured to emit an audio signal through its speaker 103, whether audible or inaudible to humans. Furthermore, device 101 is configured to receive an audio signal by microphones 104 that is reflected by the user's finger 102. This reflected audio signal is used by device 101 to continuously track finger 102 in real time as discussed further below. A more detailed description of a hardware configuration of an embodiment of device 101 is provided below in connection with FIG. 2.

Figure 2:
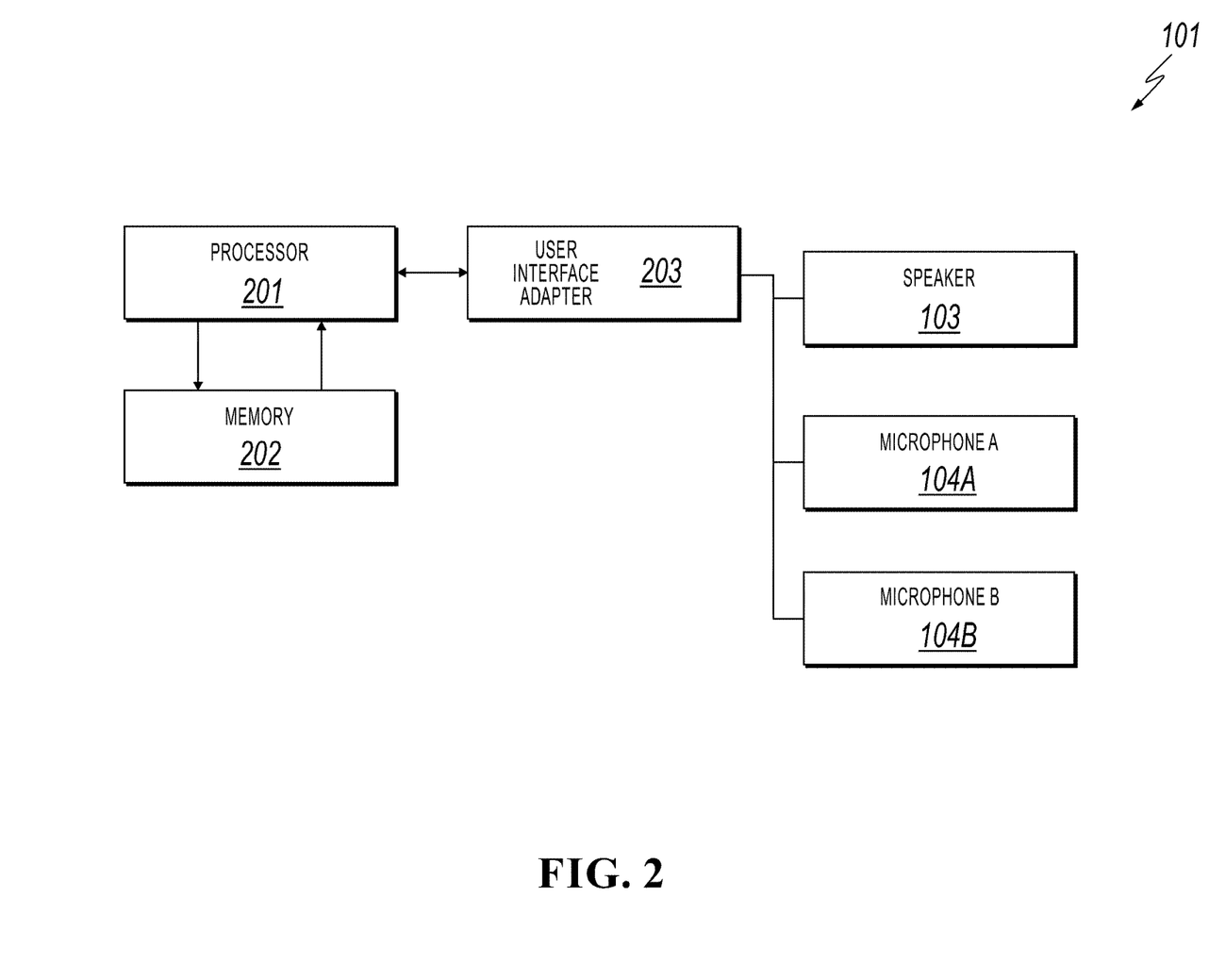
FIG. 2 illustrates a hardware configuration of a device to be controlled by the movement of a finger in accordance with an embodiment of the present invention.

Referring now to FIG. 2, FIG. 2 is a functional block diagram of an example of a controlled device 101 (FIG. 1). In this example, controlled device 101 includes one or more processors 201. Processor 201 can include one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, electronic devices, electronic units, or a combination thereof.

Processor 201 is configured to store data received by one or more interfaces and process and store the data on a memory 202. Memory 202 can be implemented within processor 201 or external to processor 201. As used herein, the term memory refers to any type of long term, short term, volatile, nonvolatile, or other memory and is not to be limited to any particular type of memory or number of memories or type of media upon which memory is stored. In one embodiment, memory 202 stores an application, such as a program for controlling device 101 using movements by finger 102 (FIG. 1) by allowing device 101 to continuously track the movement of finger 102 using acoustic signals. In one embodiment, processor 201 is configured to execute the program instructions of applications stored in memory 202.

Furthermore, speaker 103 and microphones 104A, 104B are connected to device 101 via a user interface adapter 203. Speaker 103 is configured to generate an audio signal (audible or inaudible to humans) at various frequencies. Furthermore, microphones 104A, 104B are configured to receive an audio signal that is reflected by the user's finger 102.

Device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, smart TVs, smart appliances, Virtual Reality (VR), and Augmented Reality (AR) are all becoming increasingly popular. The key to their success is having an easy-to-use user interface to control the device (e.g., smart TVs, smart appliances and devices implementing VR/AR). Currently though such devices lack an easy-to-use user interface. Smart TVs are currently cumbersome to control by having the user navigate through various menus. Many smart appliances require users to manually launch smartphone applications and click through pages to control the smart appliance, which is even more cumbersome than turning on/off switches. VR and AR provide an immersive experience, and open the doors to new ways of training, education, meeting, advertising, travel, health care, emergency responses, and scientific experiments. However, the current user interface of devices implementing VR/AR are rather limited: they rely on tapping, swiping, voice recognition, or steering the camera towards the hand to make sure the hand is within the view and line-of-sight of the camera while wearing the headset. Recently, there has been research conducted concerning motion tracking as a means for controlling the device. However, despite some progress, achieving highly accurate and responsive device-free tracking on commodity hardware remains an open challenge. According to game and application developers, sub-centimeter level accuracy and a response time within 16 ms are required in order to provide a good user experience. This is especially challenging to achieve using a commodity device, such as a smartphone, given its limited processing power and lack of special hardware. Hence, there is not currently a means for easily interacting and controlling devices, such as smart devices and devices implementing VR/AR, via highly accurate and responsive device-free tracking.

Figure 3:
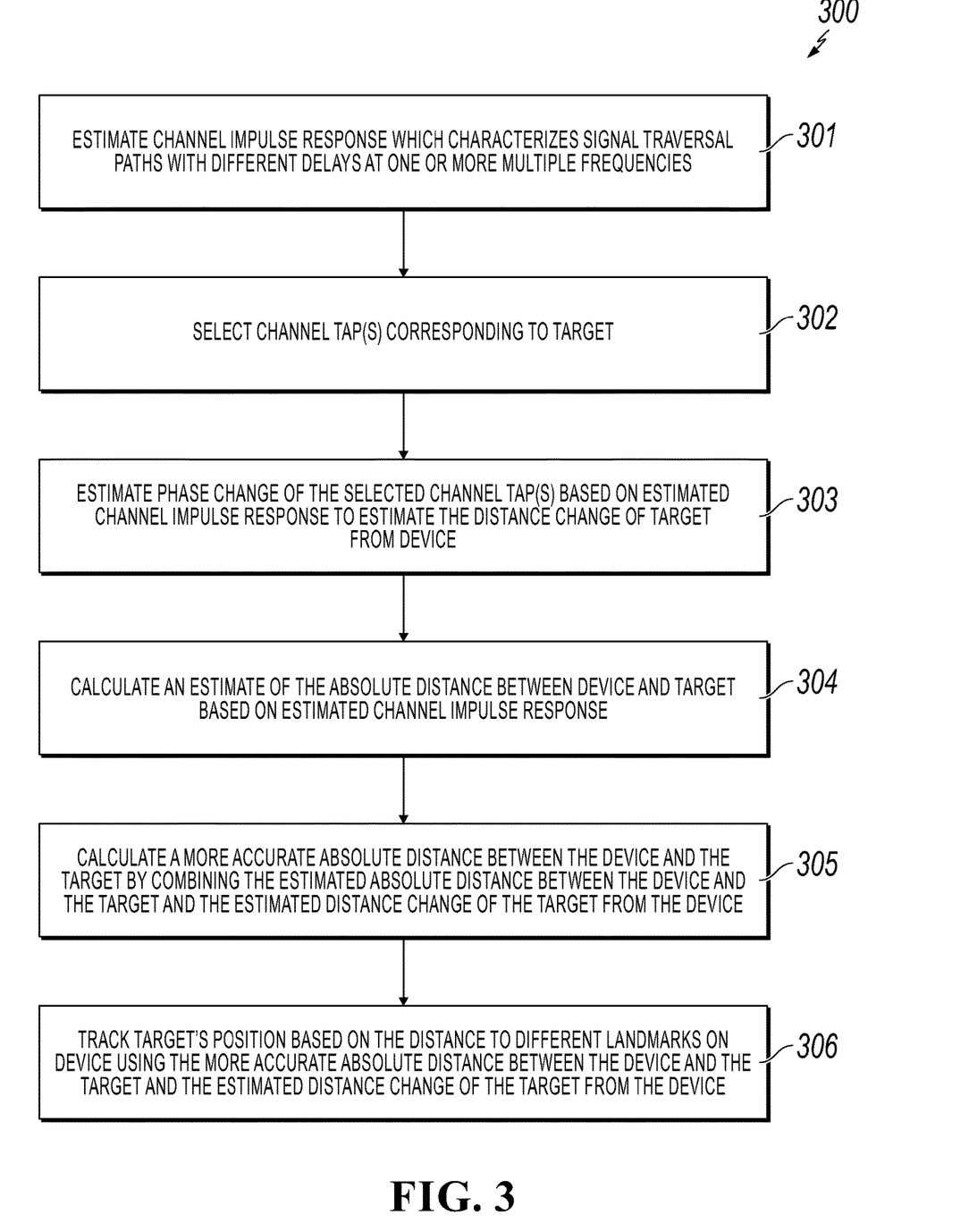
FIG. 3 is a flowchart of a method for controlling a device using finger movements by allowing the device to continuously track the movement of a finger using acoustic signals in accordance with an embodiment of the present invention.
Figure 4A:
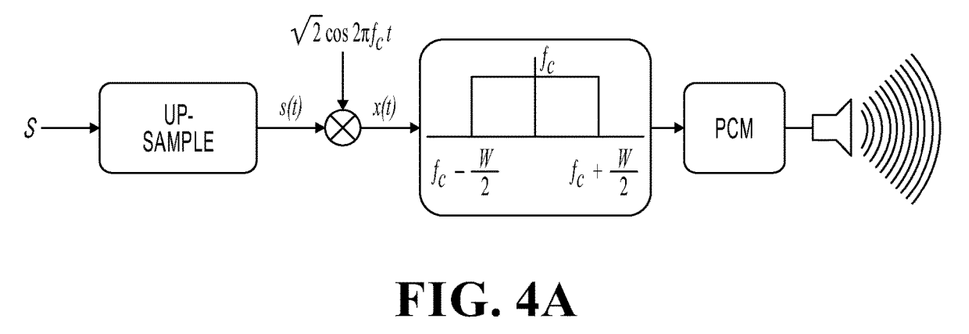
FIG. 4A illustrates the signal generation and transmission process in accordance with an embodiment of the present invention.
Figure 4B:
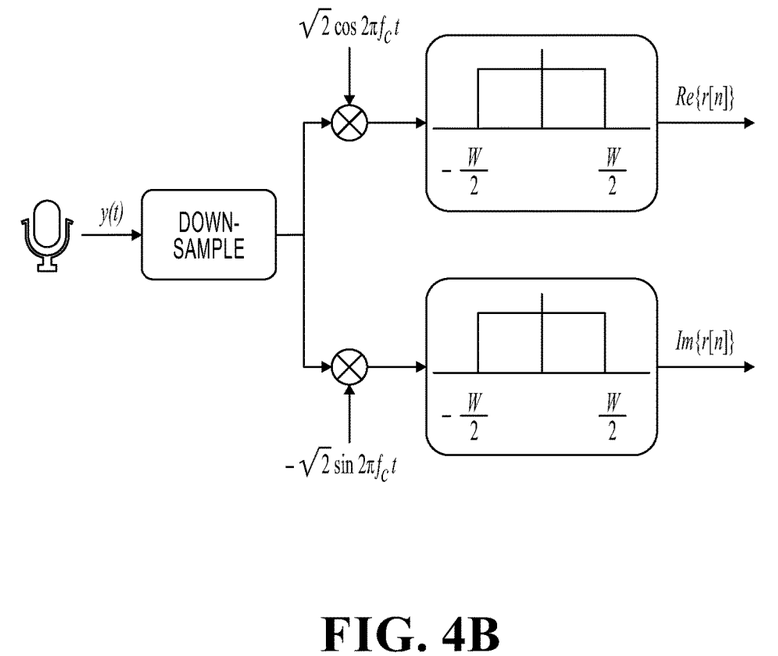
FIG. 4B illustrates the signal reception and baseband conversion process in accordance with an embodiment of the present invention.
Figure 5:
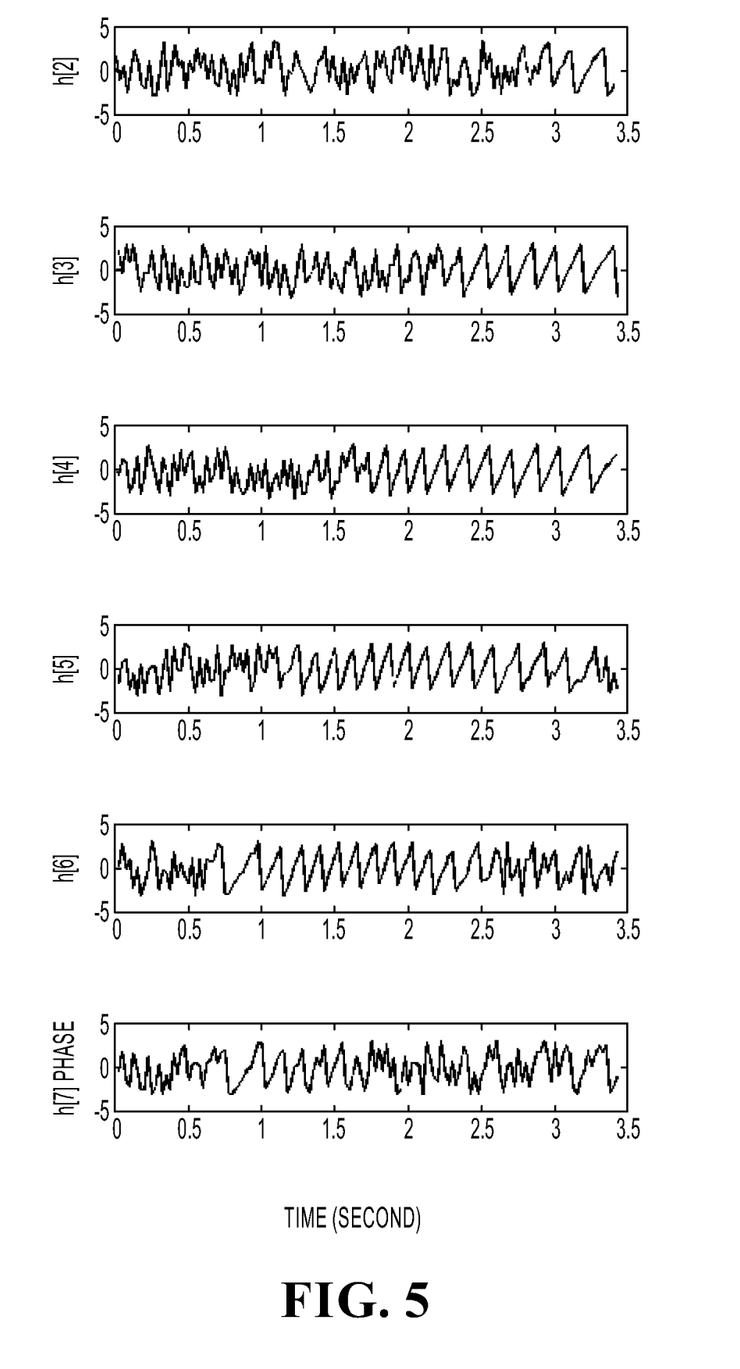
FIG. 5 illustrates the phase of multiple channel taps while the ball is moving towards the device in accordance with an embodiment of the present invention.
Figure 6A:
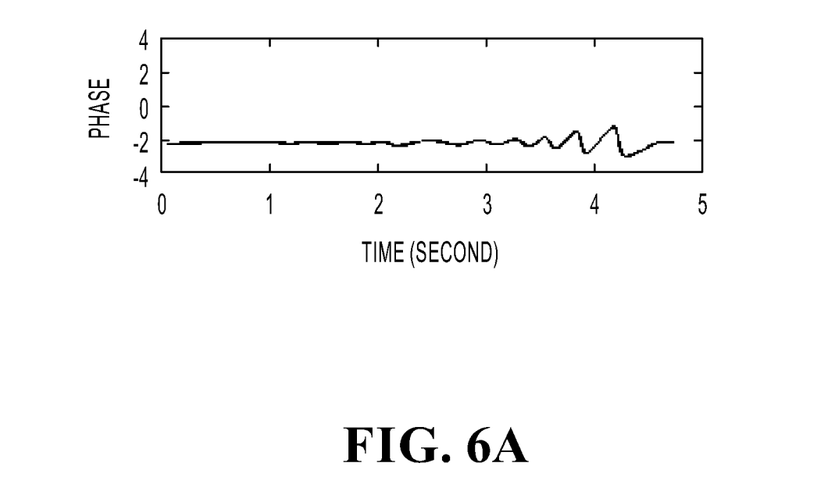
FIGS. 6A and 6B show the phases of h[k] and $h_d[k]$, respectively, while a user is moving his finger towards the speaker and microphone in accordance with an embodiment of the present invention.
Figure 6B:
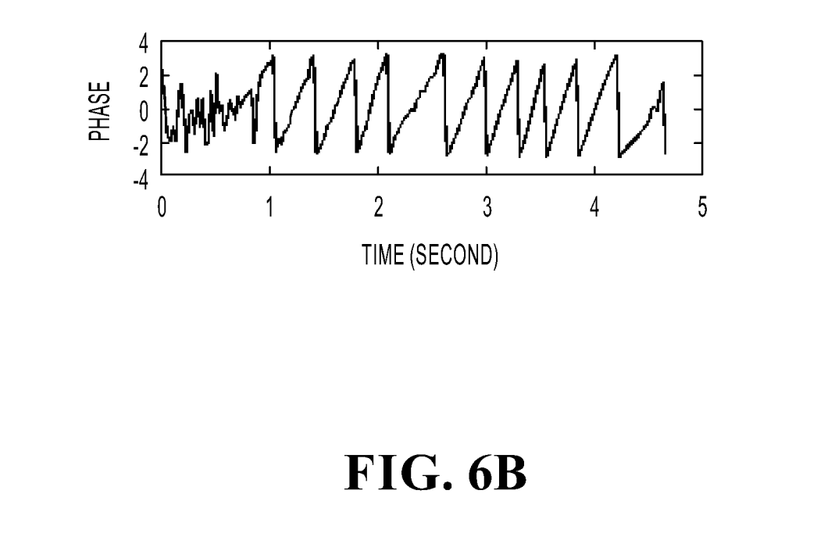
Figure 7A:
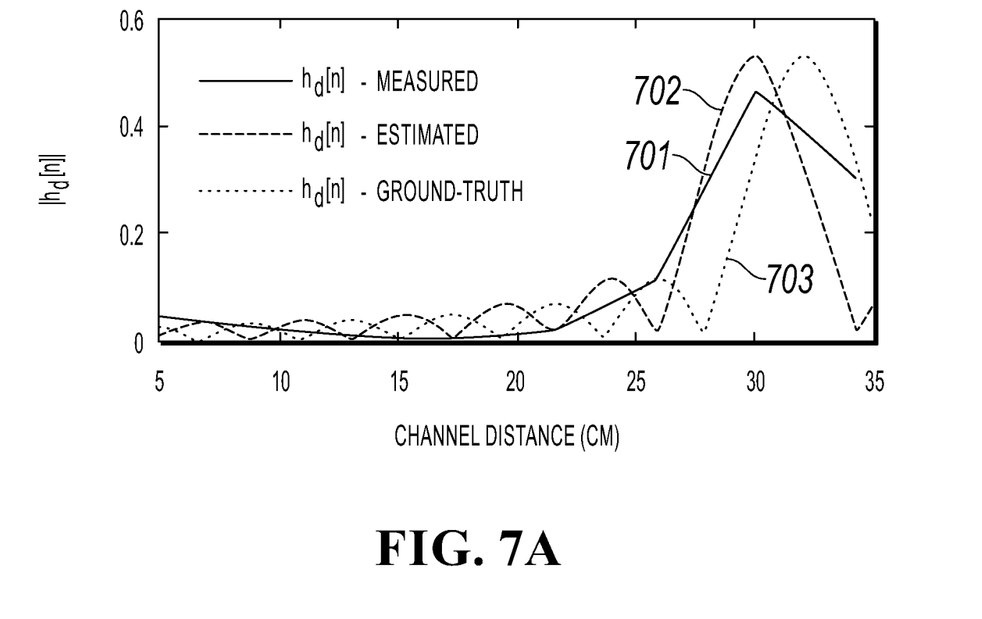
FIGS. 7A-7B show the impact of coarse-grained and fine-grained channel estimation on the absolute distance estimate, respectively, in accordance with an embodiment of the present invention.
Figure 7B:
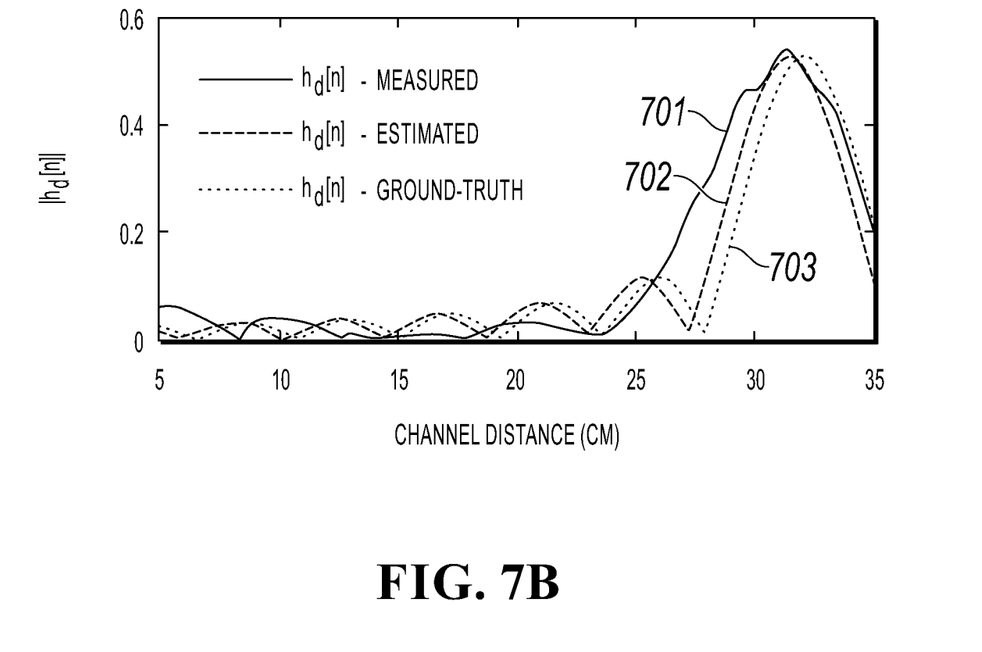

The present invention provides a means for easily interacting and controlling devices via highly accurate and responsive device-free tracking as discussed below in connection with FIGS. 3, 4A-4B, 5, 6A-6B and 7A-7B. FIG. 3 is a flowchart of a method for controlling a device using finger movements by allowing the device to continuously track the movement of a finger using acoustic signals. FIG. 4A illustrates the signal generation and transmission process. FIG. 4B illustrates the signal reception and baseband conversion process. FIG. 5 illustrates the phase of multiple channel taps while the ball is moving towards the device. FIGS. 6A and 6B show the phases of h[k] and $h_d$[k], respectively, while a user is moving his finger towards the speaker and microphone. FIGS. 7A-7B show the impact of coarse-grained and fine-grained channel estimation on the absolute distance estimate, respectively.

Referring now to FIG. 3, FIG. 3 is a flowchart of a method 300 for controlling a device (e.g., device 101 of FIGS. 1 and 2) using finger movements by allowing device 101 to continuously track the movement of an object, such as a finger (e.g., finger 102 of FIG. 1) using acoustic signals in accordance with an embodiment of the present invention.

Referring to FIG. 3, in conjunction with FIGS. 1-2, in step 301, device 101 estimates the channel impulse response which characterizes the signal traversal paths with different delays at one or more multiple frequencies.

In one embodiment, a single-carrier based communication system was used to estimate the channel in the time domain. In order to estimate the channel, a known training sequence is sent where the change of the received signal incurred by the multipath is observed. Let S={s[1], . . . s[K]} denote the training sequence, where K is the length of the sequence. In one embodiment, a 26-bit GSM training sequence was selected because it is known to have good properties for synchronization and channel estimation and widely used in single carrier communication. S was modulated to BPSK symbols, where bits 0 and 1 are mapped to baseband symbols 1 and −1, respectively.

FIG. 4A illustrates the signal generation and transmission process in accordance with an embodiment of the present invention. To transmit a modulated symbol over the inaudible frequency band, the signal bandwidth is reduced so that it does not exceed the maximum allowed bandwidth of the inaudible band. Let $f_s$ and B denote the sampling rate and the channel bandwidth, respectively. To limit the bandwidth of the transmitted symbol, the symbol is upsampled with a rate of $f_s$/B, which is done by zero padding and low-pass filtering to smooth discontinuity. Finally, the signal is up-converted to transmit it over the inaudible band. Let $f_c$ be the center frequency of the passband. The frequency of the signal is changed by multiplying $\sqrt{2}\cos(2\pi f_c t)$ to the baseband signal: $x(t)=\sqrt{2}\cos(2\pi f_c t)s(t)$, where s(t) and x(t) are upsampled baseband and passband signals, respectively. Since BPSK only has real parts, $x(t)=\sqrt{2}e^{-j2\pi f_c t}s(t)$.

To remove noise outside the transmission band, band-pass filtering is performed on x(t) with pass-band range from $f_c$−B/2 Hz to $f_c$+B/2 Hz. The generated passband signals are transmitted through speaker 103. Since the transmitted training sequence is always fixed, it can be generated offline and saved as a format of a 16-bit Pulse Coded Modulation (PCM) in a Waveform Audio (WAV) file, which can be played by any mobile computing device 101 (e.g., smartphone or smart watch).

As discussed herein, the training sequence is referred to as a frame. Between frames, a fixed gap (i.e., zero symbols) is inserted to avoid inter-frame interference. The gap should be sufficiently long so that the delayed signal from the previous frame does not interfere with the new frame. However, it should be as short as possible to provide low latency. In one embodiment, based on a study, 24 zero symbols between frames are sufficient. As a result, a frame has 50 symbols. Given that the baseband symbol interval is 1/B=0.25 ms, each frame lasts 12.5 ms. As a result, a new channel estimate can be obtained every 12.5 ms which is used to update the target's position (e.g., position of finger 102) at the same interval, which is below 16 ms which is required for providing a seamless user experience.

Referring now to FIG. 4B, FIG. 4B illustrates the signal reception and baseband conversion process in accordance with an embodiment of the present invention. The received passband signal y(t) arriving at microphone 104 is converted into a baseband symbol r[n] using the following down-conversion process: y(t) is multiplied by $\sqrt{2}\cos(2\pi f_c t)$ and $-\sqrt{2}\sin(2\pi f_c t)$ to get the real and imaginary parts of the received baseband signal, respectively. Low-path filtering and down-sampling are performed to select a signal every symbol interval. This provides the following baseband signal: $r[n]=\sqrt{2}\cos(2\pi f_c t)y(t)-j\sqrt{2}\sin(2\pi f_c t)y(t)=\sqrt{2}e^{-j2\pi f_c t}y(t)$ where t is the time that the n-th baseband symbol is sampled (i.e., t=n×$T_s$, where $T_s$ is the symbol interval).

After passband-to-baseband signal conversion, the receiver detects the first symbol of the received frame by energy detection and cross-correlation. The rough beginning of the frame is first detected based on energy detection: if the magnitude of the three consecutive symbols is higher than the threshold σ, the first symbol is treated as the beginning of the frame symbols. In one embodiment, σ=0.003. Then a more precise starting point is found based on cross-correlation. Specifically, the sample that gives the maximum cross-correlation magnitude between the received and transmitted frames is found. It is noted that the frame detection procedure is only necessary at the beginning of tracking. Since the frame interval is fixed, once a frame is detected, the subsequent frames can be determined by adding a constant frame interval.

Next, the channel is estimated based on the received frame and the known training sequence. There are several existing channel estimation algorithms in single carrier communication system that may be used, such as Maximum Likelihood Sequence Estimation (MLSE) and Least-Squares (LS) channel estimation.

For LS channel estimation, one needs to decide the reference length P and the memory length L, where L determines the number of channel taps to estimate and P+L is the training sequence length. Increasing L increases the number of channel taps to estimate but reduces the reliability of the estimation. In one embodiment, P=16 and L=10, which implies tracking movement up to 50 cm away. One can easily adapt P according to the environment.

Let m={$m_1, m_2, \ldots, m_{L+P}$} denote the training sequence. A circulant training matrix $M \in \mathbb{R}^{P \times L}$ is:

$$M = \begin{bmatrix} m_L & m_{L-1} & m_{L-2} & \cdots & m_1 \\ m_{L+1} & m_L & m_{L-1} & \cdots & m_2 \\ \vdots & \vdots & \vdots & \ddots & \vdots \\ m_{L+P} & m_{L+P-1} & m_{L+P-2} & \cdots & m_{P+1} \end{bmatrix}.$$

Let $y=\{y_1, y_2, \ldots, y_{L+P}\}$ denote the received training sequence. The channel is estimated as $$\hat{h}=(M^H M)^{-1} M^H y_L,$$

where $y_L = \{y_{L+1}, y_{L+2}, \ldots, y_{L+P}\}$.

Given the pre-computed $(M^H M)^{-1} M^H$, the computational cost of the channel estimation is only the matrix-to-vector multiplication, which is $O(P \times L)$. Given P=16 and L=10, the channel estimation complexity is low enough to implement on a mobile computing device.

Furthermore, the channel estimation is improved. In traditional digital communication, downsampling during the passband to baseband conversion simply picks one out of every r samples from the over-sampled signals, where r is the upsampling rate. In one embodiment, the over-sampled signals are averaged to reduce noise in the output. From every r samples in a sampling interval, the first l samples are selected and their average is used as the downsampled output. In one embodiment, l=4.

In step 302, device 101 selects one or more channel taps corresponding to the target (e.g., finger 102). A "target," as used herein, refers to an object (e.g., finger) that reflects signals or a receiver. In one embodiment, the channel tap(s) are selected based on a change in their magnitude and phase over a recent set of intervals across one or more frequencies.

In step 303, device 101 device 101 estimates the phase change of the selected channel tap(s) based on the estimated channel impulse response to estimate the distance change of the target (e.g., finger 102) from device 101 (e.g., microphone 104). In one embodiment, the estimated phase change of the selected channel tap(s) is computed by using an average of the first few samples to estimate the channel impulse response or using a least square or a least absolute shrinkage and selection operator (LASSO) estimate function to estimate the channel impulse response.

The phase is tracked based on the CIR estimates. The impact of the reflected signal has been studied using the following experiment. A small aluminum ball (<1 cm diameter) attached to a long and thin wood stick is moved. The person moving the stick is over 1 m away from the ball (outside the range of CIR taps). The ball is initially 30 cm away from device 101 (e.g., smartphone) and moved 20 cm towards device 101 (e.g., smartphone). FIG. 5 illustrates the phase of multiple channel taps while the ball is moving towards device 101 (e.g., smartphone) in accordance with an embodiment of the present invention. The result shows that the phase rotates in multiple taps, which indicates the path length is changing. This change is caused by the moving ball. As shown in FIG. 5, even though only a single small object moves, the phase rotation is observed in multiple taps. The experiment was repeated multiple times, and it was found that the phase rotation is observed in three consecutive taps and the reflected signal with delay τ affects the three h[n] that have the smallest $|\tau - nT_s|$. As a result, h[n] can be approximated as:

$$h[n] \approx \sum_k a_k e^{-j2\pi f_c \tau_k}, \left(n - \frac{3}{2}\right) T_s < \tau_k < \left(n + \frac{3}{2}\right) T_s.$$

In other words, each channel tap h[n] contains the phase and magnitude of the reflected signals whose delays are between $(n-3/2)T_s$ and $(n+3/2)T_s$. The path length changes with the delay $\tau_k$ according to $d_k = \tau_k V_c$, where $d_k$ is the travel distance of the path k and Vc is the propagation speed of the audio (i.e., Vc≈340 m/s). Assuming that speaker 103 and microphone 104 are closely located, the distance from microphone 104 to the reflecting object (e.g., finger 102) is approximately half of the travel distance. Therefore, h[n] indicates the object's distance from microphone 104 is between $$\left(n - \frac{3}{2}\right) \frac{T_s V_c}{2} \text{ and } \left(n + \frac{3}{2}\right) \frac{T_s V_c}{2}.$$

Given $T_s$=0.25 ms and 4 KHz bandwidth, $$\frac{T_s V_c}{2} = 4.25 \text{ cm}$$

and each tap captures objects across 12.75 cm range. This enables one to filter out the movement of objects outside the target range. For example, if one wants to track the movement of a finger within 50 cm from device 101, the channel taps can be limited to the first 10 taps to filter out the movement outside 50 cm. This is because the $10^{th}$ tap may contain information from objects up to around 12 taps away, which gives 12*4.25=51 cm.

While the CIR vector captures the channels with different propagation distances, it is still challenging to extract the phase change caused by the target movement based on CIR since multiple paths with similar distances are mixed within each channel tap. To address the issue, the problem is decomposed into the following two steps: (i) if one knows which channel tap is affected by the moving target, then how to extract the phase change caused by the target's movement, and (ii) how to determine which channel tap is affected by the target. Below is presented the approaches of the present invention to address both issues.

It is assumed that the k-th channel tap is affected by the target's movement. In order to observe the phase change of the moving target, the two consecutive channel measurements are compared. Taking difference between the two consecutive channels effectively removes dominant static reflections. Let $L_k$ denote the number of paths observed in h[k]. Suppose the $L_k$-th path is the path reflected from the moving finger 102, while the other $L_k-1$ paths remain the same during the two consecutive channel measurement periods t−1 and t.

$$h[k]^{t-1} = \sum_{i=1}^{L_k} a_i e^{-j2\pi f_c \tau_i(t-1)},$$

$$h[k]^t = \sum_{i=1}^{L_k - 1} a_i e^{-j2\pi f_c \tau_i(t)} + a L_k e^{-j2\pi f_c (\tau_{L_k}(t-1) + \tau_d(t))},$$

where $h[k]^t$ is the k-th channel tap estimated from the t-th frame and $\tau_d(t)$ is the delay difference caused by the target movement between the t-th and (t−1)-th frame intervals (i.e., $\tau_d(t) = \tau_{Lk}(t) - \tau_{Lk}(t-1)$). By taking their difference, one gets $$h_d[k]^t = a_{L_k} \left(e^{-j2\pi f_c (\tau_{L_k}(t-1) + \tau_d(t))} - e^{-j2\pi f_c \tau_{L_k}(t-1)}\right),$$

where $h_d[k]^t = h[k]^t - h[k]^{t-1}$. It is assumed that $a_{LK}$ associated with a propagation path is constant over two consecutive measurements due to a very small distance change in a 12.5 ms interval. From the angle of $h_d[k]^t$, the phrase rotation caused by the change of $\tau_{Lk}(t)$ is observed.

$$\angle(h_d[k]^t) = \angle\left(e^{-j2\pi f_c(\tau_{L_k}(t-1)+\tau_d(t))} - e^{-j2\pi f_c \tau_{L_k}(t-1)}\right) \quad (1)$$

$$= \angle\left(e^{-j2\pi f_c \tau_{L_k}(t-1)}(e^{-j2\pi f_c \tau_d(t)} - 1)\right)$$

$$= \angle\left(e^{-j2\pi f_c \tau_{L_k}(t-1)}\right) + \frac{\angle(e^{-j2\pi f_c \tau_d(t)})}{2} + \frac{\pi}{2},$$

where $\angle(X)$ is the phase of the complex number X.

FIGS. 6A and 6B show the phases of h[k] and $h_d[k]$, respectively, while a user is moving his finger 102 towards speaker 103 and microphone 104 in accordance with an embodiment of the present invention. In the collected trace, h[k] is conjectured to include the finger movement related path between 1 second and 4.6 seconds. In FIG. 6A, the phase is very stable and the change by the finger movement is not clear because the majority portion of h[k] contains signals from the static paths. After removing the impact of the static paths, one can observe clear phase rotation due to the finger movement from $h_d[k]$.

From the phase difference between $h_d[k]^{t+1}$ and $h_d[k]^t$, one obtains the phase rotation caused by the delay difference $\angle(e^{-j2\pi f_c \tau_d(t)})$, and eventually the travel distance of finger 102 during the measurement interval using the relation between the phase changes. It is noted that $\tau_d(t)=\tau_{LK}(t)-T_{LK}(t-1)$. Using Equation (1), one can represent the phase difference as $$\angle(h_d[k]^{t+1}) - \angle(h_d[k]^t) =$$

$$\angle\left(e^{-j2\pi f_c \tau_{L_k}(t)}\right) - \angle\left(e^{-j2\pi f_c \tau_{L_k}(t-1)}\right) + \frac{1}{2}\angle(e^{-j2\pi f_c \tau_d(t)}) - \angle(e^{-j2\pi f_c \tau_d(t-1)}) =$$

$$\angle(e^{-j2\pi f_c \tau_d(t)}) + \frac{1}{2}\angle(e^{-j2\pi f_c \tau_d(t)}) - \angle(e^{-j2\pi f_c \tau_d(t-1)}).$$

By solving the above equation, one can calculate $\angle(e^{-j2\pi f_c \tau_d(t)})$. When no prior $\angle(e^{-j2\pi f_c \tau_d(t-1)})$ is given, one can simply assume that $\tau_d(t)=\tau_d(t-1)$. Once the phase rotation is obtained, one can calculate the distance change based on $d^t = \lambda \times \angle(e^{-j2\pi f_c \tau_d(t)})$, where $d^t$ is the distance change of the dynamic path at time t, and $\lambda$ is the wavelength of the audio signal. This relationship holds as long as the phase change is smaller than $2\pi$, which holds for the finger movement speed and interval duration.

The above discussion assumes that one knows which tap to use for tracking the movement of finger 102. The discussion below describes how to find the channel tap corresponding to the target (e.g., finger 102). That is, the discussion below describes how to find the right tap that includes the path reflected from finger 102 among multiple possible taps. As discussed above, the phase rotation by the finger movement is observed in multiple taps rather than in a single tap. Therefore, one needs to select one of these taps.

The channel taps can be classified as dynamic taps (i.e., those taps that include dynamic paths) and static taps (i.e., those taps that do not include dynamic paths). The right taps should be dynamic taps since the present invention tracks movement of finger 102. If all the taps are static taps, then it means that finger 102 did not move and its position does not need to be updated.

Condition 1: Compared to the static taps, the dynamic taps have relatively larger variation of the channel over time. Therefore, the following test was developed to identify dynamic paths in tap k:

$$M_1[k]^t = \frac{|h[k]^t - h[k]^{t-1}|}{|h[k]^t|} > \sigma_i,$$

which compares the normalized difference in the magnitude of two consecutive channels with a threshold $\sigma_i$. In one embodiment, $\sigma_i=0.05$.

Condition 2: While the above condition distinguishes between the dynamic and static taps, the noise in the channel estimation might cause the classification error. To avoid it, another condition is added based on the following observation: the phase rotation of static tap k, denoted as $h_d[k]$, is very unstable because all static paths are removed during the differentiation process and the remaining value in $h_d[k]$ may contain random noise. In comparison, if k is a dynamic tap, the phase rotation of $h_d[k]$ is much more stable because $h_d[k]$ includes the dynamic path and its phase change over the measurement interval is relatively small. This is evident from FIGS. 5 and 6A-6B, which show the phase changes when the dynamic path is not included in the channel tap. Based on this observation, another condition is constructed to filter out static taps. The stability of the phase change is measured, which is defined as the phase change difference over the last three measurements. Specifically, the maximum phase change over the three periods is found, denoted as $M_2[k]^t = \max_{t=t-2,t-1,t} f(i)$, and $f(i)=|\angle(e^{-j2\pi f_c \tau_d^i(t)}) - \angle(e^{-j2\pi f_c \tau_d^k(t)})|$. If $M_2[k]^t$ is higher than $\sigma_2$, then a static tap may be inferred. Otherwise, a dynamic tap may be inferred. In one embodiment, $\sigma_2=0.5$.

Among the taps that passes both tests, the one with the smallest k is selected as the tap containing the path involving finger movement because finger 102 is assumed to be the closest moving object from device 101 (e.g., smartphone).

In step 304, device 101 calculates an estimate of the absolute distance between device 101 and the target (e.g., finger 102) based on the estimated channel impulse response.

At this point, the focus has been on tracking the distance change of finger 102 by observing the phase. However, an absolute distance is needed at some point in order to get the absolute distance over time. Therefore, a method has been developed to estimate the absolute distance based on the channel coefficients.

Prior techniques in accurately estimating the absolute distance between device 101 and the target (e.g., finger 102) based on the channel estimate exhibit poor accuracy in acoustic signals due to the many multipaths, which results in many unknowns and a severely under-constrained system.

As a result, a new formulation was developed for the present invention to significantly reduce the number of unknowns by only considering the paths that have changed. The results of the new formulation show it leads to a good estimate of the absolute distance. Such a method is used to estimate the initial position, which is used to translate the relative distance to the absolute distance.

In step 305, device 101 calculates a more accurate distance between device 101 and the target (e.g., finger 102) by combining the estimated absolute distance between device 101 and the target and the estimated distance change of the target from device 101. In one embodiment, the current absolute distance estimate is combined with the distance change estimate over multiple intervals to enhance the accuracy.

It is observed that there is not a need to reconstruct the complete channel profile in order to track a moving finger 102. Instead, one needs need to only reconstruct the delay and magnitude of the path that is reflected by finger 102. Since a finger 102 is small, it is reasonable to assume only one path is reflected by finger 102. Therefore, one can obtain the difference between the two consecutive CIR estimates, which will cancel out all static paths thereby leaving only dynamic paths and reduce the unknowns to the number of the parameters associated with the path that is reflected by finger 102. A path is then selected out of the remaining dynamic paths corresponding to the path reflected by finger 102.

In one embodiment, one obtains the difference between the two consecutive CIR, which removes all static paths and only keeps the path reflected by the moving finger 102:

$$h_d[n] = a(e^{-j2\pi f_c(\tau+\tau_d)}\text{sin } c(n-(\tau+\tau_d)W) - e^{-j2\pi f_c\tau}\text{sin } c(n-\tau W)). \quad (2)$$

where a and $\tau$ are the amplitude and delay of the signal reflected from finger 102, respectively. Based on the measured $h_d[n]$, the goal is to find t and a that minimize the difference between the measured and estimated CIR change, where the estimated CIR is derived from the mathematical model in Equation 2. This gives the following optimization problem:

$$\min_{\tau,a}: \sum_{n=1}^{L} (h_d[n] - a(e^{-j2\pi f_c(\tau+\tau_d)}\text{sinc}(n-(\tau+\tau_d)W) - e^{-j2\pi f_c\tau}\text{sinc}(n-\tau W)))^2$$

Such a scheme finds a single $\tau$ and a associated with the path reflected by the moving finger 102. This has two benefits: (i) it reduces the number of unknowns and decreases the computational complexity, and (ii) it removes all static paths and helps reduce the error. Once can then easily calculate the absolute distance as the product of delay ($\tau$) and sound propagation speed.

In one embodiment, while the above approach is useful to find the absolute distance, its accuracy is limited by the resolution of the estimated channel. Since the bandwidth of the channel is limited to 4 KHz, the baseband symbol interval is 0.25 ms, which is translated into the channel resolution of 4.25 cm. When one tries to find $\tau$ using h[n] sampled at 4.25 cm, the error increases due to the coarse resolution.

To enhance the accuracy, the oversampled signals were exploited to achieve finer resolution. For the over-sampled signals received between h[k] and h[k+1], the channel was estimated using the same method discussed above. These samples are 0.0208 ms apart (i.e., $1/F_s$ ms), which corresponds to the distance resolution of 3.5 mm. As a result, the resolution of the channel estimation is limited not by the baseband symbol rate but by the sampling rate of the audio signal, which is 12 times higher. With this fine-grained channel estimation, one finds T using the same optimization framework.

Referring now to FIGS. 7A-7B, FIGS. 7A-7B show the impact of coarse-grained and fine-grained channel estimation on the absolute distance estimate, respectively, in accordance with an embodiment of the present invention. In this experiment, the audio signal was recorded while a user is moving his finger 102, and the absolute distance was estimated using the measured channels. For ease of interpretation, the x-axis of FIGS. 7A-7B represents the distance corresponding to the delay of the channel. Lines 701 in FIGS. 7A-7B show the measured channel difference. Lines 702, 703 in FIGS. 7A-7B correspond to the channel differences by plugging in the estimated and ground-truth delays, respectively, into Equation 2. The ground-truth finger distance is 32 cm. The channel difference under the coarse channel estimation deviates from the ground-truth channel and has a 2 cm error. In comparison, the channel difference from the fine grained estimation is close to the ground-truth, and has only a 0.4 cm error.

In step 306, device 101 tracks the target's position based on the distance to different landmarks (e.g., "senders" and "receivers" of signals on device 101, such as speaker 103 and microphones 104) on device 101 using the more accurate absolute distance between device 101 and the target (e.g., finger 102) and the estimated distance change of the target from device 101 (e.g., smartphone). In the embodiment where the principles of the present invention are used to track a device, only the sender (e.g., transmitter) or receiver on device 101 is used to track a device. Tracking a finger in two-dimensional space may be accomplished by leveraging two microphones 204 (landmarks) on device 101 (e.g., smartphone).

In one embodiment, the relative and absolute distances are combined. Both the absolute distance and the distance change estimated from the phase are used to track the target (e.g., finger 102). At the beginning, the absolute distance is used to get the initial position of the target. Afterwards, two distance estimates are obtained: $d_k^p$ estimated from the phase and $d_k^c$ estimated from the channel difference, where $d_k^p = d_{k-1} + \Delta d_k^p$ and $\Delta d_k^p$ is computed as a function of the phase change. The two distance estimates are then combined using a weighting factor $\alpha$:

$$d_k = (1-\alpha)d_k^p + \alpha d_k^c,$$

Given the phone form factor, the relative locations of speaker 103 and microphones 104 are known. Suppose speaker 103 is located at the origin (0, 0), and the two microphones 104 are located at ($x_1$, 0) and ($x_2$, 0), respectively. It is assumed they are all aligned in the same Y-axis because modern devices, such as smartphones, are very thin. Finger 102 should be on the ellipse whose foci are ($x_i$, 0) and ($x_2$, 0) and the total distance is $d_k$. Using two microphones 104 as landmarks, finger 102 can be tracked by finding the intersection of the two ellipses. In one embodiment, the two ellipses have focal points at the landmarks on device 101 and the sum of the distance to the focal points is the estimated absolute distance between device 101 and the target, such as finger 102. There are two intersections between two ellipses when they overlap, and the one closer to the previous position is selected.

While the present invention has been discussed in connection with tracking a target, such as a finger, the principles of the present invention may be applied to tracking a device (e.g., mobile device). For example, in connection with tracking a device, the intersection between two circles (as opposed to two ellipses) is computed, where the circles centered at the landmarks have their radii set to the estimated distance from the landmarks. The intersection closer to a previous position of the target is then selected.

The present invention develops a novel device-free acoustic tracking system that achieves 0.9 cm median tracking error. Several important insights have been gained: (i) phase-based tracking is effective for acoustic signals due to its small wavelength, but the channel estimate from an appropriate tap (instead of the overall channel) is used to achieve high accuracy, (ii) it is hard to estimate the absolute distance by directly decomposing the channel since acoustic channel is not sparse, and, as a result, a formulation is used that obtains the difference between the two consecutive CIR estimates which cancels out all the static paths, which significantly reduces the number of unknowns and improves accuracy, and (iii) acoustic channels have a much higher sampling rate than the Nyquist rate and, as a result, the fine-grained channel estimation of the present invention is effective in improving the channel estimation accuracy.

Hence, the present invention enables a user to control another device (e.g., smartphone, smart watch, AR/VR headset) by simply moving his/her finger. The device can be controlled by the user's finger by being able to track the moving finger without holding anything at a mm-level accuracy.

Furthermore, while the present invention has been discussed in connection with using an audio signal for tracking, the principles of the present invention may utilize any type of signal, even signals having frequencies outside the audio frequency range of roughly 20 to 24,000 Hz, such as radio frequencies.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for controlling a device by tracking a movement of a target, the method comprising:
   estimating a channel impulse response which characterizes signal traversal paths with different delays at one or more frequencies;
   selecting one or more channel taps corresponding to said target;
   estimating a phase change of said selected one or more channel taps based on said estimated channel impulse response to estimate a distance change of said target from said device;
   tracking, by a processor, said movement of said target using said estimated distance change of said target from said device; and
   controlling said device by tracking said movement of said target.

2. The method as recited in claim 1 further comprising:
   tracking a position of said target based on a distance to different landmarks on said device using said estimated distance change of said target from said device.

3. The method as recited in claim 1 further comprising:
   calculating an estimate of an absolute distance between said device and said target based on said estimated channel impulse response at one or more frequencies over one or more intervals; and
   tracking said movement of said target using said estimated absolute distance between said device and said target.

4. The method as recited in claim 1 further comprising:
   calculating an estimate of an absolute distance between said device and said target; and
   calculating a more accurate absolute distance between said device and said target by combining said estimated absolute distance between said device and said target and said estimated distance change of said target from said device.

5. The method as recited in claim 4 further comprising:
   tracking a position of said target based on a distance to different landmarks on said device using said more accurate absolute distance between said device and said target and said estimated distance change of said target from said device.

6. The method as recited in claim 3 further comprising:
   calculating said estimate of said absolute distance between said device and said target based on said estimated channel impulse response by only considering paths that have changed.

7. The method as recited in claim 1 further comprising:
   initializing a position of said target by calculating an estimated absolute distance between said device and said target based on said estimated channel impulse response and using said initial position to translate a relative distance between said device and said target to said absolute distance between said device and said target.

8. The method as recited in claim 4 further comprising:
   combining a current estimate of said absolute distance between said device and said target with said estimated distance change of said target from said device over multiple intervals.

9. The method as recited in claim 3 further comprising:
   estimating said channel impulse response using every sample before downsampling; and
   using said channel impulse response estimation to estimate said absolute distance between said device and said target.

10. The method as recited in claim 1, wherein a single-carrier based communication system is used to estimate said channel impulse response.

11. The method as recited in claim 10, wherein said channel impulse response is estimated based on said received frame and a known training sequence from every r samples in a sampling interval, wherein an average of a first set of s samples, where a value of said s is less than or equal to a value of said r, is used to compute said channel impulse response and estimate said phase change of said selected one or more taps.

12. The method as recited in claim 1 further comprising:
    selecting a first set of sampled signals; and
    using an average of said first set of sampled signals as a downsampled output to estimate said phase change of said selected one or more taps.

13. The method as recited in claim 1, wherein said one or more channel taps contain a phase and a magnitude of reflected signals from said target.

14. The method as recited in claim 1 further comprising:
    comparing two consecutive measurements of channel taps, wherein a difference between said two consecutive measurements of said channel taps removes at least a portion of static reflections.

15. The method as recited in claim 1 further comprising:
    measuring a phase change difference of one or more channel taps over multiple periods; and identifying a dynamic tap based on said phase change difference over multiple periods across one or more frequencies.

16. The method as recited in claim 1 further comprising:
obtaining a difference between two consecutive channel impulse response estimates to cancel out static paths so that only dynamic paths remain; and
selecting a path out of said remaining dynamic paths corresponding to a path reflected by said target.

17. The method as recited in claim 2, wherein said landmarks comprise one or more the following: a sender and a receiver on said device.

18. The method as recited in claim 2 further comprising:
tracking said position of said target by finding intersections between two or more ellipses, wherein said two or more ellipses have focal points at said landmarks on said device, wherein a sum of a distance to said focal points is an estimate of an absolute distance or a more accurate absolute distance between said device and said target; and
selecting one of said intersections closer to a previous position of said target.

19. The method as recited in claim 2 further comprising:
tracking said position of said target by finding intersections between two or more circles centered at said landmarks with radii set to estimated distances from said landmarks; and
selecting one of said intersections closer to a previous position of said target.

20. The method as recited in claim 1, wherein said target comprises one of the following: a finger, a pen, a mobile device.

21. The method as recited in claim 1 further comprising:
selecting said one or more channel taps based on a change in their magnitude and phase over a recent set of intervals across one or more frequencies.

22. A computer program product for controlling a device by tracking a movement of a target, the computer program product comprising a computer readable storage medium having program code embodied therewith executed by a processor, the program code comprising the programming instructions for:
estimating a channel impulse response which characterizes signal traversal paths with different delays at one or more frequencies;
selecting one or more channel taps corresponding to said target;
estimating a phase change of said selected one or more channel taps based on said estimated channel impulse response to estimate a distance change of said target from said device;
tracking said movement of said target using said estimated distance change of said target from said device; and
controlling said device by tracking said movement of said target.

23. The computer program product as recited in claim 22, wherein the program code further comprises the programming instructions for:
tracking a position of said target based on a distance to different landmarks on said device using said estimated distance change of said target from said device.

24. The computer program product as recited in claim 22, wherein the program code further comprises the programming instructions for:
calculating an estimate of an absolute distance between said device and said target based on said estimated channel impulse response at one or more frequencies over one or more intervals; and
tracking said movement of said target using said estimated absolute distance between said device and said target.

25. The computer program product as recited in claim 22, wherein the program code further comprises the programming instructions for:
calculating an estimate of an absolute distance between said device and said target; and
calculating a more accurate absolute distance between said device and said target by combining said estimated absolute distance between said device and said target and said estimated distance change of said target from said device.

26. The computer program product as recited in claim 25, wherein the program code further comprises the programming instructions for:
tracking a position of said target based on a distance to different landmarks on said device using said more accurate absolute distance between said device and said target and said estimated distance change of said target from said device.

27. The computer program product as recited in claim 24, wherein the program code further comprises the programming instructions for:
calculating said estimate of said absolute distance between said device and said target based on said estimated channel impulse response by only considering paths that have changed.

28. The computer program product as recited in claim 22, wherein the program code further comprises the programming instructions for:
initializing a position of said target by calculating an estimated absolute distance between said device and said target based on said estimated channel impulse response and using said initial position to translate a relative distance between said device and said target to said absolute distance between said device and said target.

29. The computer program product as recited in claim 25, wherein the program code further comprises the programming instructions for:
combining a current estimate of said absolute distance between said device and said target with said estimated distance change of said target from said device over multiple intervals.

30. The computer program product as recited in claim 24, wherein the program code further comprises the programming instructions for:
estimating said channel impulse response using every sample before downsampling; and
using said channel impulse response estimation to estimate said absolute distance between said device and said target.

31. The computer program product as recited in claim 22, wherein a single-carrier based communication system is used to estimate said channel impulse response.

32. The computer program product as recited in claim 31, wherein said channel impulse response is estimated based on said received frame and a known training sequence from every r samples in a sampling interval, wherein an average of a first set of s samples, where a value of said s is less than or equal to a value of said r, is used to compute said channel impulse response and estimate said phase change of said selected one or more taps.

33. The computer program product as recited in claim 22, wherein the program code further comprises the programming instructions for:
selecting a first set of sampled signals; and
using an average of said first set of sampled signals as a downsampled output to estimate said phase change of said selected one or more taps.

34. The computer program product as recited in claim 22, wherein said one or more channel taps contain a phase and a magnitude of reflected signals from said target.

35. The computer program product as recited in claim 22, wherein the program code further comprises the programming instructions for:
comparing two consecutive measurements of channel taps, wherein a difference between said two consecutive measurements of said channel taps removes at least a portion of static reflections.

36. The computer program product as recited in claim 22, wherein the program code further comprises the programming instructions for:
measuring a phase change difference of one or more channel taps over multiple periods; and
identifying a dynamic tap based on said phase change difference over multiple periods across one or more frequencies.

37. The computer program product as recited in claim 22, wherein the program code further comprises the programming instructions for:
obtaining a difference between two consecutive channel impulse response estimates to cancel out static paths so that only dynamic paths remain; and
selecting a path out of said remaining dynamic paths corresponding to a path reflected by said target.

38. The computer program product as recited in claim 23, wherein said landmarks comprise one or more the following: a sender and a receiver on said device.

39. The computer program product as recited in claim 23, wherein the program code further comprises the programming instructions for:
tracking said position of said target by finding intersections between two or more ellipses, wherein said two or more ellipses have focal points at said landmarks on said device, wherein a sum of a distance to said focal points is an estimate of an absolute distance or a more accurate absolute distance between said device and said target; and
selecting one of said intersections closer to a previous position of said target.

40. The computer program product as recited in claim 23, wherein the program code further comprises the programming instructions for:
tracking said position of said target by finding intersections between two or more circles centered at said landmarks with radii set to estimated distances from said landmarks; and
selecting one of said intersections closer to a previous position of said target.

41. The computer program product as recited in claim 22, wherein said target comprises one of the following: a finger, a pen, a mobile device.

42. The computer program product as recited in claim 22, wherein the program code further comprises the programming instructions for:
selecting said one or more channel taps based on a change in their magnitude and phase over a recent set of intervals across one or more frequencies.

43. A device, comprising:
a memory unit for storing a computer program for controlling said device by tracking a movement of a target; and
a processor coupled to the memory unit, wherein the processor is configured to execute the program instructions of the computer program comprising:
estimating a channel impulse response which characterizes signal traversal paths with different delays at one or more frequencies;
selecting one or more channel taps corresponding to said target;
estimating a phase change of said selected one or more channel taps based on said estimated channel impulse response to estimate a distance change of said target from said device;
tracking said movement of said target using said estimated distance change of said target from said device; and
controlling said device by tracking said movement of said target.

44. The device as recited in claim 43, wherein the program instructions of the computer program further comprise:
tracking a position of said target based on a distance to different landmarks on said device using said estimated distance change of said target from said device.

45. The device as recited in claim 43, wherein the program instructions of the computer program further comprise:
calculating an estimate of an absolute distance between said device and said target based on said estimated channel impulse response at one or more frequencies over one or more intervals; and
tracking said movement of said target using said estimated absolute distance between said device and said target.

46. The device as recited in claim 43, wherein the program instructions of the computer program further comprise:
calculating an estimate of an absolute distance between said device and said target; and
calculating a more accurate absolute distance between said device and said target by combining said estimated absolute distance between said device and said target and said estimated distance change of said target from said device.

47. The device as recited in claim 46, wherein the program instructions of the computer program further comprise:
tracking a position of said target based on a distance to different landmarks on said device using said more accurate absolute distance between said device and said target and said estimated distance change of said target from said device.

48. The device as recited in claim 45, wherein the program instructions of the computer program further comprise:
calculating said estimate of said absolute distance between said device and said target based on said estimated channel impulse response by only considering paths that have changed.

49. The device as recited in claim 43, wherein the program instructions of the computer program further comprise:
initializing a position of said target by calculating an estimated absolute distance between said device and said target based on said estimated channel impulse response and using said initial position to translate a relative distance between said device and said target to said absolute distance between said device and said target.

50. The device as recited in claim 46, wherein the program instructions of the computer program further comprise:
combining a current estimate of said absolute distance between said device and said target with said estimated distance change of said target from said device over multiple intervals.

51. The device as recited in claim 45, wherein the program instructions of the computer program further comprise:
estimating said channel impulse response using every sample before downsampling; and
using said channel impulse response estimation to estimate said absolute distance between said device and said target.

52. The device as recited in claim 43, wherein a single-carrier based communication system is used to estimate said channel impulse response.

53. The device as recited in claim 52, wherein said channel impulse response is estimated based on said received frame and a known training sequence from every r samples in a sampling interval, wherein an average of a first set of s samples, where a value of said s is less than or equal to a value of said r, is used to compute said channel impulse response and estimate said phase change of said selected one or more taps.

54. The device as recited in claim 43, wherein the program instructions of the computer program further comprise:
selecting a first set of sampled signals; and
using an average of said first set of sampled signals as a downsampled output to estimate said phase change of said selected one or more taps.

55. The device as recited in claim 43, wherein said one or more channel taps contain a phase and a magnitude of reflected signals from said target.

56. The device as recited in claim 43, wherein the program instructions of the computer program further comprise:
comparing two consecutive measurements of channel taps, wherein a difference between said two consecutive measurements of said channel taps removes at least a portion of static reflections.

57. The device as recited in claim 43, wherein the program instructions of the computer program further comprise:
measuring a phase change difference of one or more channel taps over multiple periods; and
identifying a dynamic tap based on said phase change difference over multiple periods across one or more frequencies.

58. The device as recited in claim 43, wherein the program instructions of the computer program further comprise:
obtaining a difference between two consecutive channel impulse response estimates to cancel out static paths so that only dynamic paths remain; and
selecting a path out of said remaining dynamic paths corresponding to a path reflected by said target.

59. The device as recited in claim 44, wherein said landmarks comprise one or more the following: a sender and a receiver on said device.

60. The device as recited in claim 44, wherein the program instructions of the computer program further comprise:
tracking said position of said target by finding intersections between two or more ellipses, wherein said two or more ellipses have focal points at said landmarks on said device, wherein a sum of a distance to said focal points is an estimate of an absolute distance or a more accurate absolute distance between said device and said target; and
selecting one of said intersections closer to a previous position of said target.

61. The device as recited in claim 44, wherein the program instructions of the computer program further comprise:
tracking said position of said target by finding intersections between two or more circles centered at said landmarks with radii set to estimated distances from said landmarks; and
selecting one of said intersections closer to a previous position of said target.

62. The device as recited in claim 43, wherein said target comprises one of the following: a finger, a pen, a mobile device.

63. The device as recited in claim 43, wherein the program instructions of the computer program further comprise:
selecting said one or more channel taps based on a change in their magnitude and phase over a recent set of intervals across one or more frequencies.

* * * * *